United States Patent [19]
Tsuji et al.

[11] Patent Number: 5,738,736
[45] Date of Patent: Apr. 14, 1998

[54] HYDROGEN STORAGE ALLOY AND ELECTRODE THEREFROM

[75] Inventors: Yoichiro Tsuji, Katano; Osamu Yamamoto, Hirakata; Hajime Seri, Izumiotsu; Toshihiro Yamada, Neyagawa; Yoshinori Toyoguchi, Yao, all of Japan

[73] Assignee: Matsushita Electric Industrial Co., Ltd., Osaka-fu, Japan

[21] Appl. No.: 683,559

[22] Filed: Jul. 15, 1996

[30] Foreign Application Priority Data

Jul. 18, 1995 [JP] Japan ................... 7-181290
Aug. 3, 1995 [JP] Japan ................... 7-198501
Aug. 18, 1995 [JP] Japan ................... 7-210833

[51] Int. Cl.$^6$ ................... C22C 14/00
[52] U.S. Cl. ................... 148/421; 420/900; 420/421; 423/644; 429/218; 429/283
[58] Field of Search ................... 429/218, 223; 420/900, 421, 424, 443, 451, 588; 148/422, 442, 421, 427; 423/644

[56] References Cited

U.S. PATENT DOCUMENTS

| | | | |
|---|---|---|---|
| Re. 34,588 | 4/1994 | Hong | 423/644 |
| 4,849,205 | 7/1989 | Hong | 423/644 |
| 5,006,328 | 4/1991 | Hong | 423/644 |
| 5,277,999 | 1/1994 | Ovshinsky et al. | 429/59 |
| 5,389,333 | 2/1995 | Li et al. | 420/455 |

FOREIGN PATENT DOCUMENTS

| | | |
|---|---|---|
| 0 570 957 A3 | 11/1993 | European Pat. Off. |
| 3031471 A1 | 9/1983 | Germany |
| 04052242 | 2/1992 | Japan |
| 04187733 | 7/1992 | Japan |
| 05247568 | 9/1993 | Japan |
| 06 228687 | 8/1994 | Japan |
| 06 228699 | 8/1994 | Japan |
| WO 93/22801 | 11/1993 | WIPO |

*Primary Examiner*—John Sheehan
*Attorney, Agent, or Firm*—Panitch Schwarze Jacobs & Nadel, P.C.

[57] ABSTRACT

The present invention provides an improved hydrogen storage alloy of Ti—V—Ni system having a body-centered cubic structure. The alloy is of the general formula $Ti_x(V_aCr_{1-a})_{1-x}M_bNi_c$, wherein M represents at least one element of La and Ce or a mischmetal, and wherein $0.5 \leq a \leq 0.95$, $0.01 \leq b \leq 0.1$, $0.1 \leq c \leq 0.6$, and $0.2 \leq x \leq 0.4$; or $Ti_xV_yM_zNi_{1-x-y-z}$, wherein M represents at least one element selected from the group consisting of Co, Fe, Cu, and Ag, and wherein $0.2 \leq x \leq 0.4$, $0.3 \leq y \leq 0.7$, $0.1 \leq z \leq 0.3$, and $0.6 \leq x+y+z \leq 0.95$.

10 Claims, 8 Drawing Sheets

HYDROGEN STORAGE ALLOY AND ELECTRODE THEREFROM

BACKGROUND OF THE INVENTION

1. Field of the Invention

The present invention relates to a hydrogen storage alloy, which electrochemically absorbs and desorbs hydrogen in a reversible manner, and also to an electrode prepared from such hydrogen storage alloy.

2. Description of the Prior Art

With recent advancement of portable equipment and cordless equipment, batteries having a much higher energy density are required as a power source of such equipment. In order to attain such requirement, metal hydrides, for example, nickel-hydrogen storage batteries using electrodes prepared from a hydrogen storage alloy (hereinafter referred to as hydrogen storage alloy electrodes), have been noted, and various compositions of the hydrogen storage alloy electrodes and the manufacturing processes thereof have been proposed.

The hydrogen storage alloy electrodes, which can reversibly absorb and desorb hydrogen, have a larger theoretical capacity density than that of cadmium electrodes and are free from deformation or dendrite formation unlike zinc electrodes. The hydrogen storage alloy electrodes therefore have excellent durability and no adverse effects on the environment and are largely expected to be applied to a negative electrode for alkaline storage batteries with a high energy density.

The alloys used for such hydrogen storage alloy electrodes are generally prepared by arc melting method or high-frequency induction heat-melting method. Practically available examples include multi-component alloys of La (or Mm)-Ni system, wherein Mm represents a mischmetal. The multi-component alloys of La (or Mm)-Ni system, which are classified as type $AB_5$, where A denotes an element having a high affinity for hydrogen, such as La, Zr, or Ti, and B represents a transition element, such as Ni, Mn, or Cr, have already reached the possible highest capacity, and further improvement cannot be expected. Development of novel materials for hydrogen storage alloys with a larger discharge capacity is thus highly demanded.

Hydrogen storage alloys of Ti—V system having a body-centered cubic structure can store a larger amount of hydrogen. For instance, $Ti_xV_yNi_z$ alloys (Japanese Laid-Open Patent Publication No. 6-228699) and $Ti_xV_yFe_z$ alloys (Japanese Laid-Open Patent Publication No. 6-93366) are the proposed alloys of this system.

When the hydrogen storage alloys of the Ti—V system are applied to electrodes, the resultant batteries have a higher discharge capacity, compared with the multi-component alloys of the La (or Mm)-Ni system; the alloys of this system, however, require further improvement to facilitate their handling and to increase favorable characteristics of the resultant batteries.

It is generally very difficult to pulverize such solid-solution alloys having a large malleability by mechanical means. When mechanical pulverization is difficult, repeated hydrogen absorption and desorption by and from the hydrogen storage alloys and the resultant conversion of the alloy to hydrides may facilitate the pulverization. Alloys of the Ti—V system are, however, difficult to activate in an initial stage, and a high-temperature atmosphere is required for hydrogenation. In addition to these industrially disadvantageous conditions, electrodes of the Ti—V alloys for batteries have insufficient cycle performance and high-rate discharge characteristics.

SUMMARY OF THE INVENTION

The object of the present invention is to provide a novel hydrogen storage alloy of body-centered cubic structure, which allows easy handling, with less deterioration of the properties due to the repeated charge and discharge cycles, and improves high-rate discharge characteristics of the resultant batteries.

The inventors have successfully solved the above-mentioned problems as a result of extensive studies on the composition of alloy and its manufacturing process.

The present invention provides a hydrogen storage alloy, which has a body-centered cubic structure comprising Ti, V, Cr, and Ni as a main alloy phase, the alloy containing 1 to 10 atom % of at least one element of La and Ce or a mischmetal.

Mm represents a mixture of rare earth elements, which includes La and Ce as its main components.

In accordance with one preferable embodiment of the present invention, the alloy is represented by the general formula $Ti_x(V_aCr_{1-a})_{1-x}M_bNi_c$, wherein M represents at least one element of La and Ce or a Mischmetal, and wherein $0.5 \leq a \leq 0.95$, $0.01 \leq b \leq 0.1$, $0.1 \leq c \leq 0.6$, and $0.2 \leq x \leq 0.4$, and has a body-centered cubic structure as a main alloy phase.

In accordance with another preferable embodiment of the present invention, the alloy comprises a second phase, which is mainly composed of one or a plurality of rare earth elements, included in the main alloy phase, preferably in a finely dispersed state.

It is preferable that the alloy is prepared by abruptly cooling at a rate of $10^3$ to $10^{7°}$ C./sec. after melting.

It is also preferable that the alloy is pulverized into fine particles after melting by quench granulation method.

The present invention is also directed to a hydrogen storage alloy, which is represented by the general formula $Ti_xV_yM_zNi_{1-x-y-z}$, wherein M represents at least one element selected from the group consisting of Co, Fe, Cu, and Ag, and wherein $0.2 \leq x \leq 0.4$, $0.3 \leq y < 0.7$, $0.1 \leq z \leq 0.3$, and $0.6 \leq x+y+z \leq 0.95$ and comprises a body-centered cubic structure as a main alloy phase thereof.

In accordance with still another preferable embodiment of the present invention, the alloy contains 5 or less atom % of at least one element selected from the group consisting of Cr, Mo, W, Al, Mn, Zn, Zr, Hf, Si, B, P, and S.

The present invention further provides a hydrogen storage alloy electrode prepared from the above-defined hydrogen storage alloy or its hydride.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
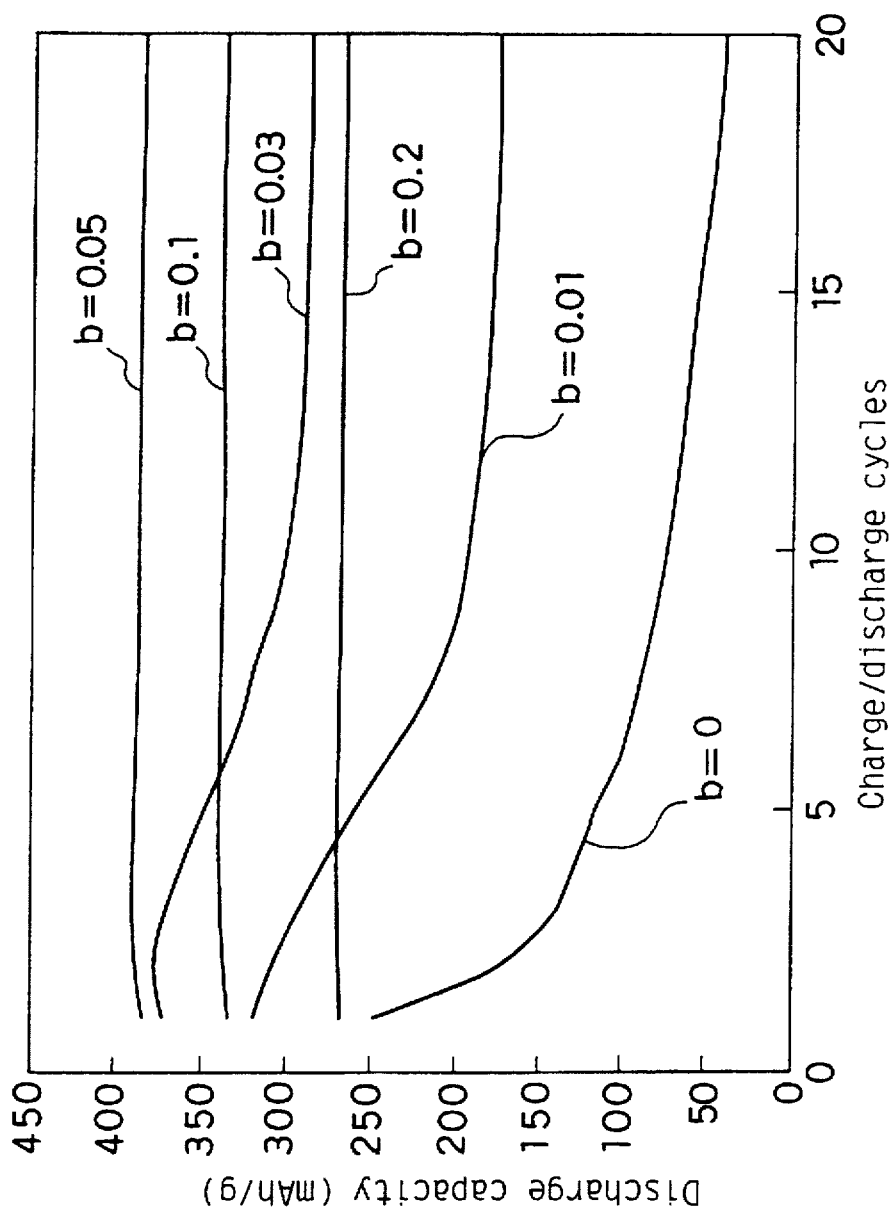
FIG. 1 is a graph showing characteristics of charge and discharge cycles with respect to electrodes prepared from alloys represented by the formula $Ti_{0.4}(V_{0.7}Cr_{0.3})_{0.6}Ni_{0.1}La_b$ and having different amounts of La 'b'.

The hydrogen storage alloy of the present invention is obtained by modifying the conventional alloy of the Ti—V—Ni system having a body-centered cubic structure.

In accordance with one preferable embodiment, the alloy is represented by the general formula $Ti_x(V_aCr_{1-a})_{1-x}M_bNi_c$, wherein M represents at least one element of La and Ce or Mm, and wherein $0.5 \leq a \leq 0.95$, $0.01 \leq b \leq 0.1$, $0.1 \leq c \leq 0.6$, and $0.2 \leq x \leq 0.4$, and has a body-centered cubic structure as a main alloy phase.

The alloy of the preferable embodiment is obtained by adding at least one element of La and Ce or Mm to the conventional alloy. This favorably improves the discharge characteristics and cycle performance. Further addition of Cr facilitates a conversion of the alloy to hydrides. Addition of La or Ce alone or in combination improves the properties of the resultant alloy to some extent. However, such improvement in the properties of the resultant alloy can be attained by addition of Mm, which is a mixture of rare earth elements, at a lower cost.

Effects of adding rare earth elements, such as La and Ce, have not yet been clarified. It is, however, supposed that such rare earth elements form hydroxides in an alkaline solution and act as a catalyst for electrode reaction or that these elements are scattered as a second phase in the alloy and prevent the alloy from changing to the powdery state. According to the results of examination by the inventors, these elements are present mostly alone or with a slight amount of Ni and are hardly included in a main phase. Unlike Japanese Laid-Open Patent Publication No. 6-228699, the addition of rare earth elements to the alloy do not result in lowering the hydrogen equilibrium pressure. The effects of the addition of rare earth elements in the present invention are accordingly different from those disclosed in the above-identified reference.

Addition of these rare earth elements at a ratio of less than 1 atom % to the mother alloy does not exert any effects, while the ratio of not less than 10 atom % undesirably lowers the capacity. The preferable range of the amount 'b' of rare earth elements to be added is thus defined as $0.01 \leq b \leq 0.1$.

Cr is added to accelerate activation of the alloy. A high-pressure hydrogen atmosphere of several hundred degree Celsius is generally required to convert the alloy of the Ti—Ni system to hydrides. This conversion process requires specific equipment and is not practical for industrial applications. Addition of Cr, however, facilitates the conversion of the alloy to hydrides even at room temperature only by introducing hydrogen of several-tens atmospheric pressure. Cr also increases mechanical weakness and allows easy pulverization of the alloy. Even when the alloy is pulverized into fine particles by the hydrogenation process, mechanical grinding is required to some extent. Addition of Cr is thus advantageous to accelerate the mechanical grinding process.

A larger amount of Cr enhances the mechanical grinding ability and largely accelerates the activation, while undesirably decreasing the amount of hydrogen storage and increasing the hydrogen equilibrium pressure. In order to satisfy the conflicting characteristics, the preferable range of the amount of Cr '(1-a)' to the amount of V 'a' is defined as $0.05 \leq 1-a \leq 0.5$.

Ni is essential when the hydrogen storage alloy electrochemically absorbs and desorbs hydrogen. However, since the excess amount of Ni undesirably decreases the amount of hydrogen storage, suitable adjustment of the amount of Ni is necessary in order to balance the amount of hydrogen storage with the discharge capacity as well as to realize a possible largest discharge capacity. The preferable range of the amount of Ni 'c' is thus defined as $0.1 \leq c \leq 0.6$.

The excess amount of Ti 'x' with respect to the total amount of V and Cr increases the number of elements having a high affinity for hydrogen, thus stabilizing hydrogen in the alloy and preventing hydrogen from being released from the alloy. The insufficient amount, on the other hand, undesirably decreases the amount of hydrogen storage. The suitable range of the amount of Ti 'x' is thus defined as $0.2 \leq x \leq 0.4$.

As discussed above, the rare earth elements exist in the alloy as a second phase or segregation phase, which is different from the main phase, and are supposed to act as a catalyst and prevent the alloy from changing to the powdery state. The state of distribution of this phase is thus expected to affect the characteristics of the resultant electrodes, that is, the finer the distribution, the better the action. The inventors have found that cooling the alloy at a rate of $10^3$ to $10^{7\circ}$ C./sec. enables the second phase to be finely distributed, thus improving the characteristics of the resultant electrodes. Gas atomizing, water atomizing, and roll quenching processes may be applicable to realize such a cooling rate. These applicable processes enable easy handling of the alloy of body-centered cubic structure, which is not easily ground by mechanical means.

In accordance with another preferable embodiment, the alloy is represented by the general formula $Ti_xV_yM_zNi_{1-x-y-z}$, wherein M represents at least one element selected from the group consisting of Co, Fe, Cu, and Ag, and wherein $0.2 \leq x \leq 0.4$, $0.3 \leq y < 0.7$, $0.1 \leq z \leq 0.3$, and $0.6 \leq x+y+z \leq 0.95$ and has a body-centered cubic structure as a main alloy phase thereof.

The alloy of this preferable embodiment is obtained by adding at least one element selected from the group consisting of Co, Fe, Cu, and Ag at a concentration of not less than 10 atom % and not larger than 30 atom %. This effectively improves the cycle performance of the resultant electrodes. The amount of less than 10 atom % does not sufficiently improve the cycle performance, whereas that of larger than 30 atom % results in a significant decrease in capacity.

The preferable amounts of the respective elements are given below.

The excess amount of Ti 'x' increases the number of elements having a high affinity for hydrogen, thereby stabilizing hydrogen in the alloy and preventing a release of hydrogen from the alloy. The insufficient amount, on the other hand, makes activation rather difficult and enables conversion to hydrides only in an atmosphere of very high temperature and high pressure. The preferable range of the amount of Ti 'x' is thus defined as $0.2 \leq x \leq 0.4$.

The larger amount of V 'y' increases the amount of hydrogen storage, while reducing the hydrogen equilibrium pressure to lower the available capacity of the resultant batteries and increasing dissolution into an electrolyte to worsen the cycle performance. Taking into account the favorable capacity and cycle performance, the preferable range of the amount of V 'y' is defined as $0.3 \leq y < 0.7$.

Ni is essential when the hydrogen storage alloy electrochemically absorbs and desorbs hydrogen. However, since the excess amount of Ni '1-x-y-z' undesirably decreases the amount of hydrogen storage, suitable adjustment of the amount of Ni is necessary in order to balance the amount of hydrogen storage with the discharge capacity as well as to realize the possible largest discharge capacity. The preferable range of the amount of Ni '1-x-y-z' is thus defined as $0.05 \leq 1-x-y-z \leq 0.4$.

The amount of the fifth element, which is selected from the group consisting of Cr, Mo, W, Al, Mn, Zn, Zr, Hf, Si, B, P, and S, is not larger than 5 atom %. The effects of adding such elements are discussed below.

Cr, Mo, and W further improve the cycle performance.

Al, Mn, and Zn improve the flatness of the plateau area of the hydrogen equilibrium pressure of the alloy. Addition of these elements has substantially no effects on the potential amount of hydrogen storage of the alloy, but increases the amount of hydrogen usable for batteries.

Addition of Zr or Hf makes a little amount of the second phase having Laves or another structure which is different from the body-centered cubic structure, thereby improving the high-rate discharge characteristics.

Si, B, P, and S decrease the hysteresis of the hydrogen absorption-desorption pressures of the alloy. Since a large hysteresis increases the difference between the charging voltage and the discharging voltage and worsens the efficiency, a small hysteresis is preferable.

When any additional elements are added in an amount exceeding 5 atom %, adverse effects, such as lowered capacity, become prominent. The preferable amount is accordingly not larger than 5 atom %.

In the following description, the hydrogen storage alloy of the present invention will be illustrated in more detail by way of examples and comparative examples with reference to the attached drawings.

EXAMPLE 1

The effects of adding rare earth elements were studied as follows.

Characteristics of charge and discharge cycles were measured for the alloys represented by the formula $Ti_{0.4}(V_{0.7}Cr_{0.3})_{0.6}Ni_{0.1}La_b$, with varying amounts of La 'b', from 0, 0.01, 0.03, 0.05, 0.1, to 0.2, and for those containing Ce or Mm in fixed amount of b=0.05, in place of La. The Mm used here comprised 31% by weight of La, 51% by weight of Ce, 12% by weight of Nd, 5% by weight of Pr, and 1% by weight of others.

Alloy samples were prepared by arc melting commercially available metal materials Ti, V, Cr, Ni, La, Ce, and Mm.

Part of each alloy sample was used for analyses, such as X-ray diffraction, and hydrogen absorption-desorption measurement in a hydrogen atmosphere (known as hydrogen pressure-composition-temperature (PCT) measurement), and the rest for evaluation of the characteristics of the resultant electrodes.

X-ray diffraction measurement was first carried out for each alloy sample. X-ray diffraction proved that the main component of the alloy phase of each alloy sample had a body-centered cubic structure.

The results of PCT measurement showed that each hydrogen storage alloy with the body-centered cubic structure had two-stage plateau areas on the low pressure side and the high pressure side in the PCT curve, that the plateau area on the high pressure side was mainly utilized for batteries, and that the amount of hydrogen storage decreased a slight in proportion to the amount of rare earth elements while changes in the hydrogen equilibrium pressure were substantially absent.

A half-cell test was carried out in the following manner in order to evaluate the characteristics of each alloy sample as a negative electrode for an alkaline storage battery, based on electrochemical charging and discharging reactions.

Each alloy sample was pulverized to particles by absorbing and desorbing hydrogen thereby and therefrom, and the particles of 75 μm or less in diameter were collected. To 1 g of each resultant alloy powder, 3 g of Ni powder and 0.12 g of polyethylene powder were added as a conductive material and a binder, respectively. The mixture thus obtained was formed into a pellet with the application of pressure, and the resultant pellet was heated at 130° C. for melting the binder to produce an electrode.

The electrode thus prepared was used as a negative electrode and a nickel oxide electrode having an excess electric capacity was used as a counter electrode. Both electrodes were soaked in an electrolyte composed of an aqueous potassium hydroxide solution having a specific gravity of 1.30, so that an open cell having an affluent electrolyte solution and a capacity regulated by the negative electrode of hydrogen storage alloy was prepared. The cell was charged at an electric current of 100 mA per 1 g of the hydrogen storage alloy for 5.5 hours and discharged at an electric current of 50 mA per 1 g of the alloy until the terminal voltage decreased to 0.8 V. This charge and discharge cycle was repeated.

Figure 2:
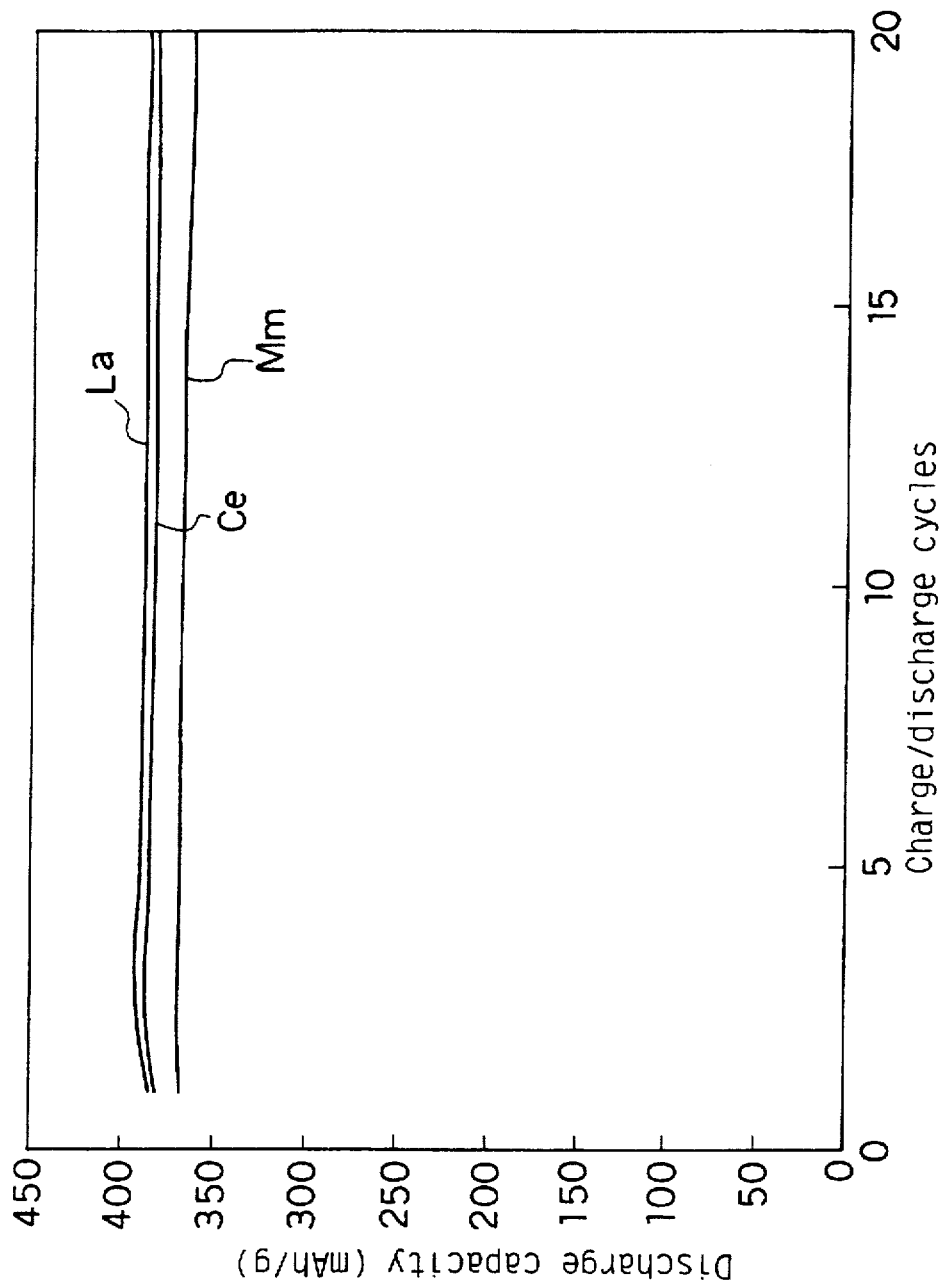
FIG. 2 is a graph showing characteristics of charge and discharge cycles with respect to electrodes prepared from alloys represented by the formula $Ti_{0.4}(V_{0.7}Cr_{0.3})_{0.6}Ni_{0.1}M_{0.05}$, wherein M represents La, Ce, or Mm.

FIG. 1 shows the relation between the discharge capacity and the number of charge and discharge cycles of the electrodes prepared from the alloys with varying amounts of La. FIG. 2 shows the relation between the discharge capacity and the number of charge and discharge cycles of the electrodes prepared from the alloys containing Ce or Mm in the fixed amount of b=0.05, in place of La. With an increase in the amount of La, the decrease in capacity due to the repeated charge and discharge cycles was relieved. Substantially no deterioration of the capacity but a maximum capacity was observed when b=0.05. In the range exceeding b=0.05, an increase in the amount of La resulted in a decrease in the discharge capacity.

Among the various rare earth elements, substantially no difference was observed between La and Ce, whereas Mm caused a slight decrease in discharge capacity. This can be ascribed to the effects of the elements included in Mm other than La and Ce. Adding both La and Ce had substantially the same effects as adding either La or Ce.

EXAMPLE 2

The amounts of Ti, V, Cr, and Ni added to the alloys were examined next. The alloys were prepared in the same manner as in Example 1.

Like Example 1, part of each alloy sample thus prepared was used for analyses, such as X-ray diffraction, and PCT measurement in a hydrogen atmosphere, and the rest for evaluation of the characteristics of the resultant electrodes.

Evaluation of the electrode characteristics was carried out by the half-cell test described in Example 1.

Figure 4:
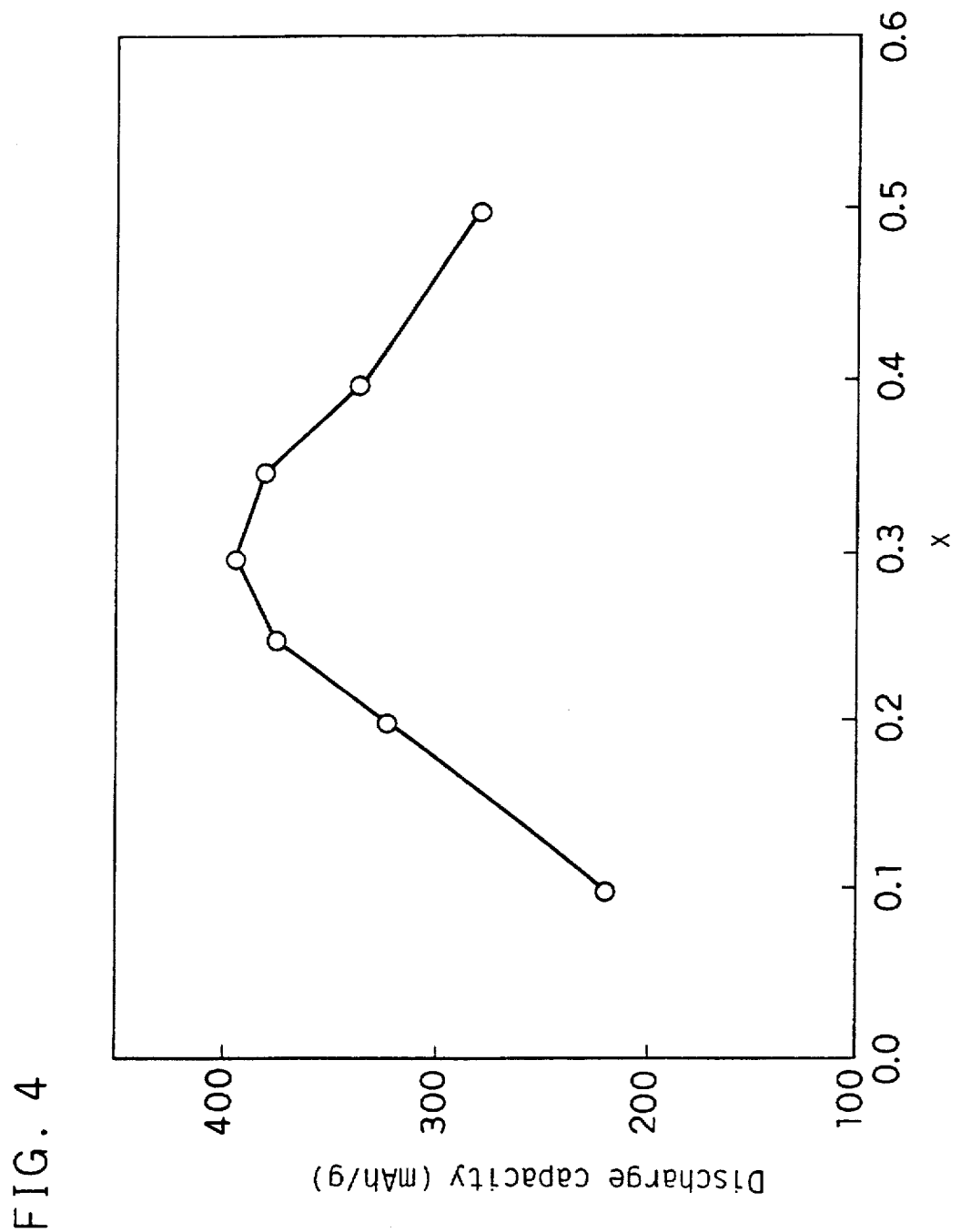
FIG. 4 is a graph showing the maximum discharge capacity vs. the value 'x', with respect to the electrodes prepared from alloys represented by the formula $Ti_x$ $(V_{0.8}Cr_{0.2})_{0.7}Ni_{0.1}La_{0.05}$.
Figure 5:
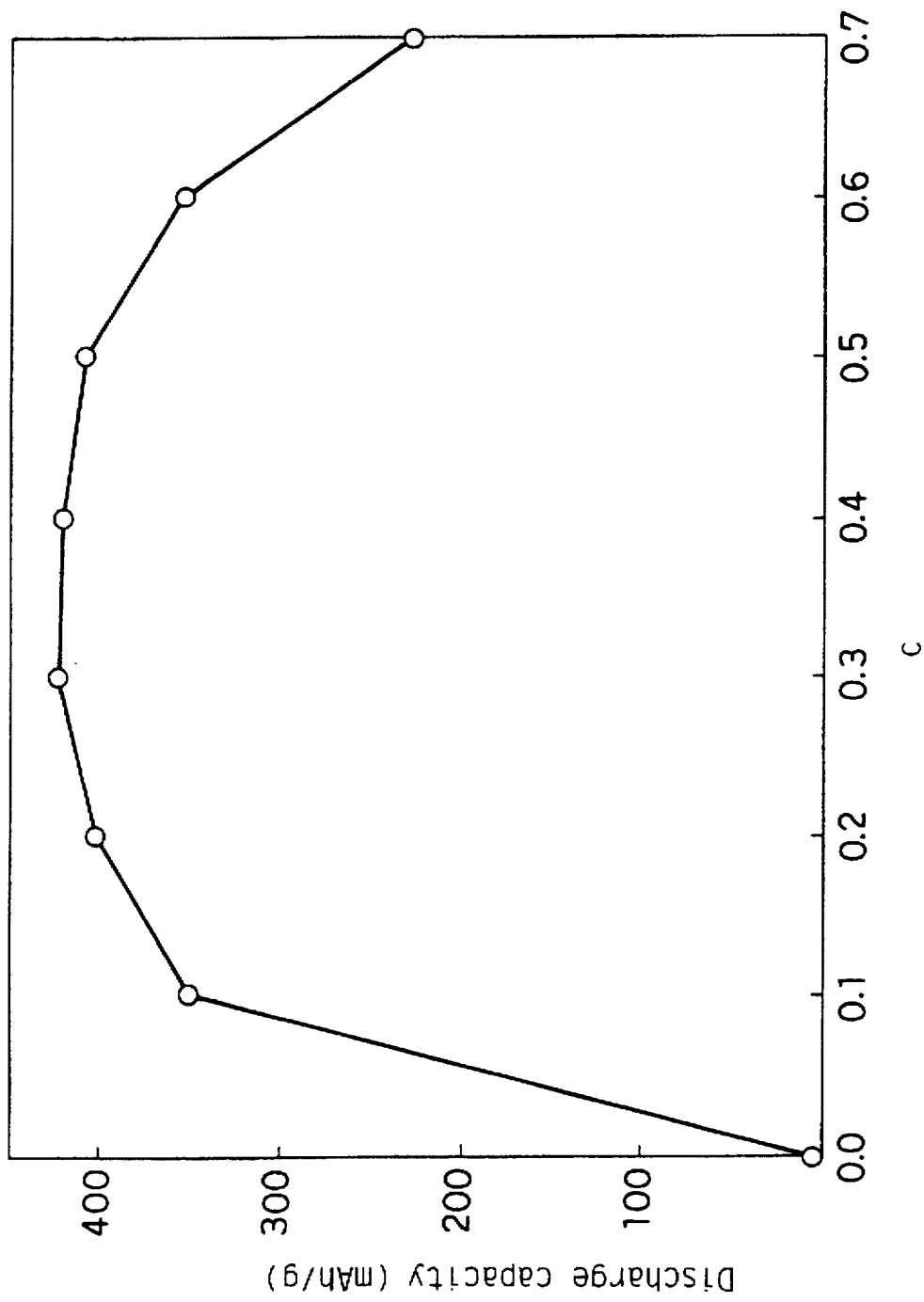
FIG. 5 is a graph showing the maximum discharge capacity vs. the value 'c', with respect to the electrodes prepared from alloys represented by the formula $Ti_{0.3}$ $(V_{0.8}Cr_{0.2})_{0.7}Ni_cLa_{0.05}$.

The maximum discharge capacity was measured when 'a', 'x', or 'c' was varied in the alloys represented by the general formula $Ti_x(V_aCr_{1-a})_{1-x}La_bNi_c$. The results of measurement are shown in FIGS. 3 to 5.

Figure 3:
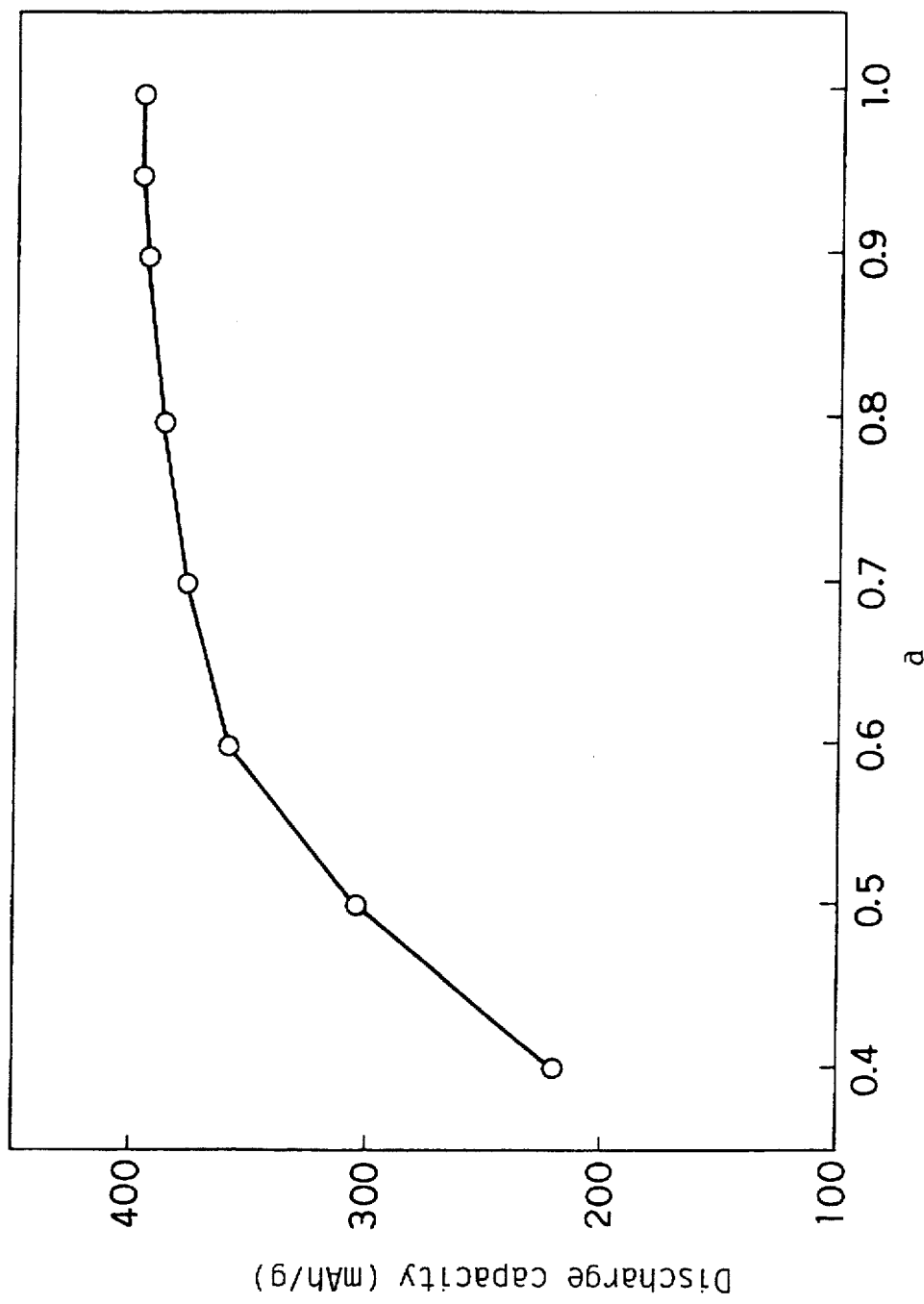
FIG. 3 is a graph showing the maximum discharge capacity vs. the value 'a', with respect to the electrodes prepared from alloys represented by the formula $Ti_{0.3}$ $(V_aCr_{1-a})_{0.7}Ni_{0.1}La_{0.05}$.

FIG. 3 is a graph showing the maximum discharge capacity vs. the value of 'a', with respect to the electrodes prepared from alloys represented by the formula $Ti_{0.3}(V_aCr_{1-a})_{0.7}Ni_{0.1}La_{0.05}$. FIG. 4 is a graph showing the maximum discharge capacity vs. the value of 'x', with respect to the electrodes prepared from alloys represented by the formula $Ti_x(V_{0.8}Cr_{0.2})_{0.7}Ni_{0.1}La_{0.05}$. FIG. 5 is a graph showing the maximum discharge capacity vs. the value of 'c', with respect to the electrodes prepared from alloys represented by the formula $Ti_{0.3}(V_{0.8}Cr_{0.2})_{0.7}Ni_cLa_{0.05}$.

The amounts 'a', 'b', 'c', and 'x' within the ranges specified above ensured a high discharge capacity of not lower than 300 mAh/g for the resultant electrodes.

Although Cr had no favorable effects on the discharge capacity, absent of addition of Cr (that is, a=1) resulted in failure of activation of the alloy even when a hydrogen pressure of 50 atm was applied at 200° C., and did not allow pulverization of the alloy by mechanical means. The alloy having a=0.95 was activated under these conditions, and that having a=0.7 or less was mechanically pulverized to particles of 5 mm or smaller in diameter with a grinder, such as a titanium boride Elise motor punch. The results of measurements showed that the preferable range of the amount of Cr '1–a' was 0.05 to 0.5 in order to satisfy both the industrially easy handling property and the discharge capacity of the resultant battery.

Alloys including Ti, V, Cr, and Ni out of the above-specified ranges had excellent cycle performance while having a relatively low capacity. The effects of adding rare earth elements are accordingly not restricted to the composition range specified above, but alloys of body-centered cubic structure having a composition close to the above range are expected to exert similar effects. Even when other elements are further added, the rare earth elements exist as a second phase and separately contribute to the improvement in the cycle performance.

EXAMPLE 3

As clearly understood from the above-mentioned examples, addition of rare earth elements realizes hydrogen storage alloy electrodes having a high capacity and excellent cycle performance. As discussed previously, the rare earth elements were dispersed in the main phase together with a slight amount of Ni, in a form of separate phase. The effects of the distributing condition on the electrode characteristics were studied next.

After high-frequency melting, alloys having the composition of $Ti_{0.4}(V_{0.5}Cr_{0.5})_{0.6}Ni_{0.1}La_{0.07}$ were cast in an iron casting mold, or gas-atomized to a powder, or changed to a ribbon-like alloy by a water-cooling double-roller.

These alloys thus treated were analyzed by EPMA. In the cast alloy, the second phase of rare earth elements was sparsely scattered as relatively large blocks of 5 to 10 µm. In the gas-atomized or ribbon-like alloys, on the other hand, the second phase was finely distributed, having a size of several µm or less. The electrode characteristics of these alloys were evaluated in the same manner as in Example 1.

Figure 6:
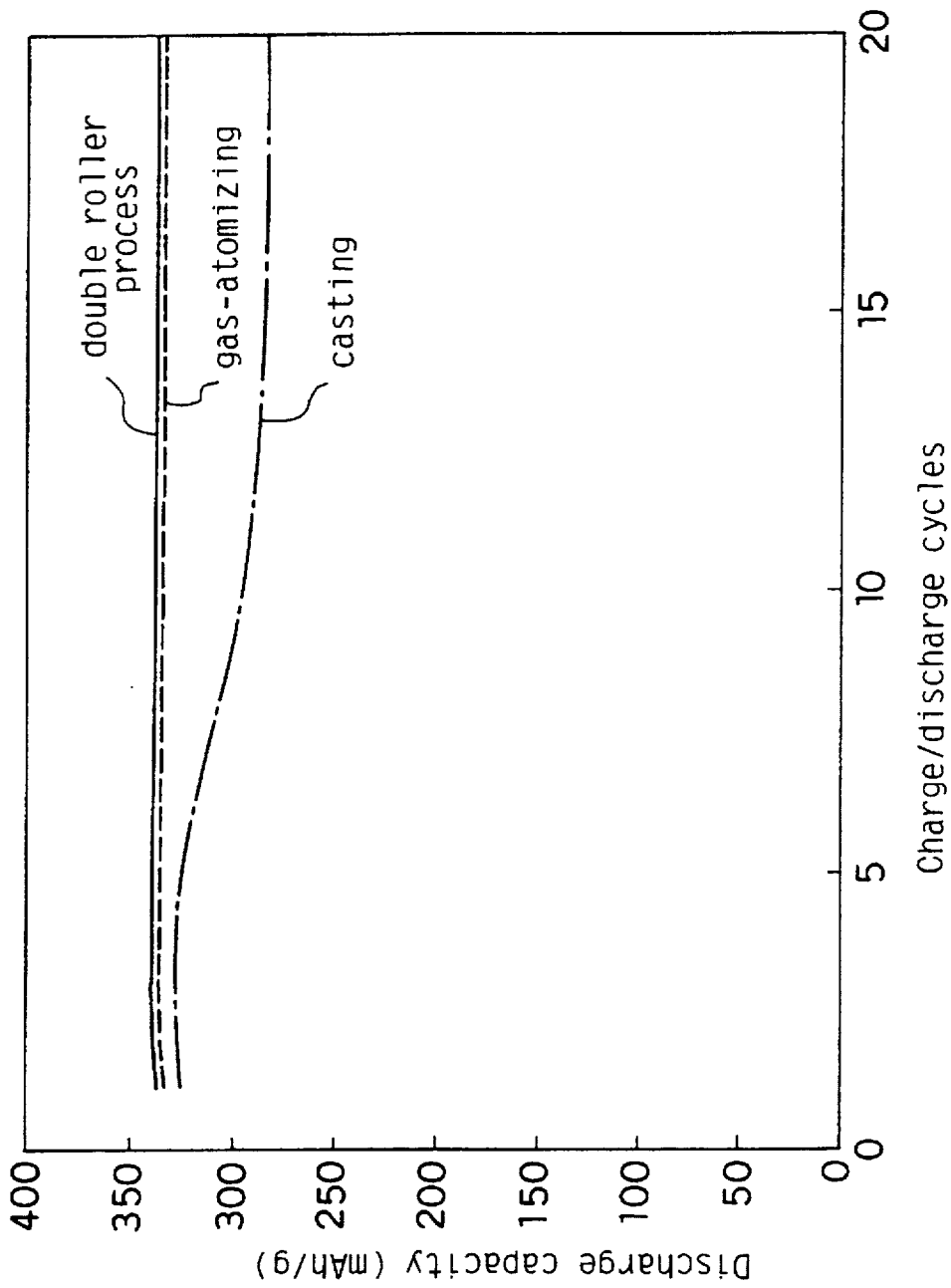
FIG. 6 is a graph showing a comparison of the characteristics of charge and discharge cycles between electrodes using alloys prepared by various manufacturing processes.

The results of evaluation are shown in FIG. 6. In the cast alloy having the relatively large second phase, addition of rare earth elements was less effective, and the deterioration of discharge capacity increased with the progress of charge and discharge cycles. The gas-atomized or ribbon-like alloys, on the other hand, showed favorable cycle performance. The cooling rate in the gas-atomizing process was $10^3$ to $10^{5°}$ C./sec., while that in the double-roller process was $10^5$ to $10^{7°}$ C./sec. In preparation of alloys, cooling at a rate of not less than $10^{3°}$ C./sec. results in a satisfactory dispersion of rare earth elements and improves the cycle performance. Cooling at higher cooling rates is less likely to change the performance more significantly. Such ultra-quenching process is not general nor practical from the viewpoint of cost effectiveness. It is accordingly preferable that the cooling rate is set in the range of $10^3$ to $10^{7°}$ C./sec. in order to facilitate mass production of the alloys with excellent electrode characteristics at the practical cost.

EXAMPLE 4

Hydrogen storage alloys represented by the general formula $Ti_xV_yM_zNi_{1-x-y-z}$, wherein M represents at least one element selected from the group consisting of Co, Fe, Cu, and Ag, and wherein $0.2 \leq x \leq 0.4$, $0.3 \leq y < 0.7$, $0.1 \leq z \leq 0.3$, and $0.6 \leq x+y+z \leq 0.95$, and having a body-centered cubic structure as a main alloy phase were prepared in this example.

A preferable composition range was examined for the respective elements first.

Alloys having the composition of No. 1 to No. 23 specified in Table 1 were prepared and examined for their characteristics. Nos. 1 to 9 were references having the composition out of the range of the present invention, whereas Nos. 10 to 23 were examples in accordance with the present invention.

TABLE 1

| Sample No. | Composition of alloy |
| --- | --- |
| 1 | $Ti_{0.1}V_{0.5}Co_{0.3}Ni_{0.1}$ |
| 2 | $Ti_{0.3}V_{0.2}Fe_{0.3}Ni_{0.2}$ |
| 3 | $Ti_{0.5}V_{0.2}Cu_{0.2}Ni_{0.1}$ |
| 4 | $Ti_{0.2}V_{0.7}Ag_{0.5}Ni_{0.05}$ |
| 5 | $Ti_{0.3}V_{0.6}Ni_{0.1}$ |
| 6 | $Ti_{0.3}V_{0.55}Co_{0.05}Ni_{0.1}$ |
| 7 | $Ti_{0.2}V_{0.2}Fe_{0.4}Ni_{0.2}$ |
| 8 | $Ti_{0.3}V_{0.5}Cu_{0.2}$ |
| 9 | $Ti_{0.2}V_{0.3}Ag_{0.1}Ni_{0.5}$ |
| 10 | $Ti_{0.3}V_{0.4}Co_{0.2}Ni_{0.1}$ |
| 11 | $Ti_{0.3}V_{0.4}Fe_{0.2}Ni_{0.1}$ |
| 12 | $Ti_{0.3}V_{0.4}Cu_{0.2}Ni_{0.1}$ |
| 13 | $Ti_{0.3}V_{0.4}Ag_{0.2}Ni_{0.1}$ |
| 14 | $Ti_{0.2}V_{0.5}Co_{0.05}Fe_{0.05}Ni_{0.2}$ |
| 15 | $Ti_{0.2}V_{0.5}Co_{0.05}Cu_{0.05}Ni_{0.2}$ |
| 16 | $Ti_{0.2}V_{0.5}Co_{0.05}Ag_{0.05}Ni_{0.2}$ |
| 17 | $Ti_{0.2}V_{0.5}Fe_{0.05}Cu_{0.05}Ni_{0.2}$ |
| 18 | $Ti_{0.2}V_{0.5}Fe_{0.05}Ag_{0.05}Ni_{0.2}$ |
| 19 | $Ti_{0.2}V_{0.5}Cu_{0.05}Ag_{0.05}Ni_{0.2}$ |
| 20 | $Ti_{0.2}V_{0.3}Co_{0.1}Fe_{0.1}Cu_{0.1}Ni_{0.2}$ |
| 21 | $Ti_{0.2}V_{0.3}Co_{0.1}Cu_{0.1}Ag_{0.1}Ni_{0.2}$ |
| 22 | $Ti_{0.2}V_{0.3}Fe_{0.1}Cu_{0.1}Ag_{0.1}Ni_{0.2}$ |
| 23 | $Ti_{0.2}V_{0.3}Co_{0.1}Fe_{0.1}Ag_{0.1}Ni_{0.2}$ |

Alloy samples were prepared by arc melting commercially available metal materials Ti, V, Co, Fe, Cu, Ag, and Ni.

Part of each alloy sample was used for analyses by X-ray diffraction, for example, and PCT measurement in a hydrogen atmosphere, and the rest for evaluation of the characteristics of the resultant electrodes.

X-ray diffraction measurement was first carried out for each alloy sample. X-ray diffraction proved that the main component of the alloy phase of each alloy sample had a body-centered cubic structure.

A half-cell with a capacity restricted by a negative electrode was prepared in the following manner and the characteristics of each alloy sample as a negative electrode for an alkaline storage battery were evaluated.

Each alloy sample was pulverized to particles by absorbing and desorbing hydrogen, and the particles of 75 μm or less in diameter were collected. Sample No. 1 did not absorb hydrogen even in a hydrogen atmosphere of 50 atom at 200° C. and could not be pulverized into particles. This is caused by an insufficient amount of Ti, which results in a low affinity for hydrogen and makes absorption of hydrogen rather difficult. The electrode characteristics were thus evaluated for the remaining alloy samples excluding No. 1.

To 1 g of each resultant alloy powder, 3 g of Ni powder and 0.12 g of polyethylene powder were added as a conductive material and a binder, respectively. The mixture thus obtained was formed into a pellet with the application of pressure, and the resultant pellet was heated at 130° C. for melting the binder to produce an electrode.

The electrode thus prepared was used as a negative electrode, whereas a nickel oxide electrode having an excess electric capacity was used as a counter electrode. Both electrodes were soaked in an electrolyte composed of an aqueous potassium hydroxide solution having a specific gravity of 1.30, so that an open cell having affluent electrolyte and a capacity restricted by the negative electrode of hydrogen storage alloy was prepared. The cell was charged at an electric current of 100 mA per 1 g of the hydrogen storage alloy for 5.5 hours and discharged at an electric current of 50 mA per 1 g of the alloy until the terminal voltage decreased to 0.8 V. This charge and discharge cycle was repeated.

Table 2 shows the maximum discharge capacity of each electrode and the deterioration per cycle up to 50 cycles after reaching the maximum capacity.

TABLE 2

| Sample No. | Maximum discharge capacity (mAh/g) | Cycle deterioration (%/cycle) |
| --- | --- | --- |
| 2 | 126 | 0.48 |
| 3 | 183 | 0.02 |
| 4 | 398 | 1.26 |
| 5 | 406 | 1.48 |
| 6 | 387 | 1.22 |
| 7 | 213 | 0.18 |
| 8 | 12 | 1.67 |
| 9 | 154 | 0.26 |
| 10 | 390 | 0.05 |
| 11 | 372 | 0.07 |
| 12 | 383 | 0.06 |
| 13 | 388 | 0.05 |
| 14 | 409 | 0.07 |
| 15 | 415 | 0.07 |
| 16 | 421 | 0.06 |
| 17 | 403 | 0.09 |
| 18 | 408 | 0.08 |
| 19 | 400 | 0.07 |
| 20 | 363 | 0.05 |
| 21 | 373 | 0.03 |
| 22 | 358 | 0.05 |
| 23 | 370 | 0.04 |

Data of Table 2 show that the electrodes prepared from the alloys in accordance with the present invention have higher capacities than those of the currently available $AB_5$ alloys having a maximum capacity of not less than 350 mAh/g, with a deterioration of as low as 0.1%/cycle or less. These prove that the electrodes in accordance with the present invention have excellent characteristics compared with those of the reference electrodes.

In order to clarify the reason of less cycle deterioration, the electrodes after completion of charge and discharge cycles were observed with a scanning electron microscope (SEM). The observation showed that the electrodes in accordance with the present invention were hardly changed to the powdery state. This prevented dissolution of the alloy into the electrolyte, thereby causing less deterioration of the alloy and ensuring the excellent cycle performance.

EXAMPLE 5

The effects of adding Cr, Mo, W, Al, Mn, Zn, Zr, Hf, Si, B, P, S, and rare earth elements were examined in this example. The rare earth elements used were La, Ce, and Mm used in Example 1. The alloy compositions examined were prepared by adding 3 atom % of the respective elements to the alloy No. 15 specified in Example 4. Alloy samples were manufactured in an arc melting furnace. Part of each alloy sample was used for analyses by X-ray diffraction, e.g., and PCT measurement in a hydrogen atmosphere, and the rest for evaluation of the characteristics of the resultant electrodes.

A half-cell test was carried out in the same manner as in Example 4 for evaluation of the electrode characteristics.

In all the alloy samples tested, the maximum discharge capacity was in the range of 380 to 394 mAh/g and the cycle deterioration was in the range of 0.07 to 0.03%/cycle. Addition of the above elements did not significantly affect the high capacity and the excellent cycle performance of the alloy No. 15.

In order to examine the cycle performance of the alloys containing Cr, Mo, or W, the deterioration was measured after completion of 300 charge and discharge cycles. While the alloy No. 15 had a cycle deterioration of 0.12%/cycle, those containing Cr, Mo, or W had improved cycle performance, that is, they had a cycle deterioration of 0.07, 0.09, and 0.08%/cycle, respectively.

Figure 7:
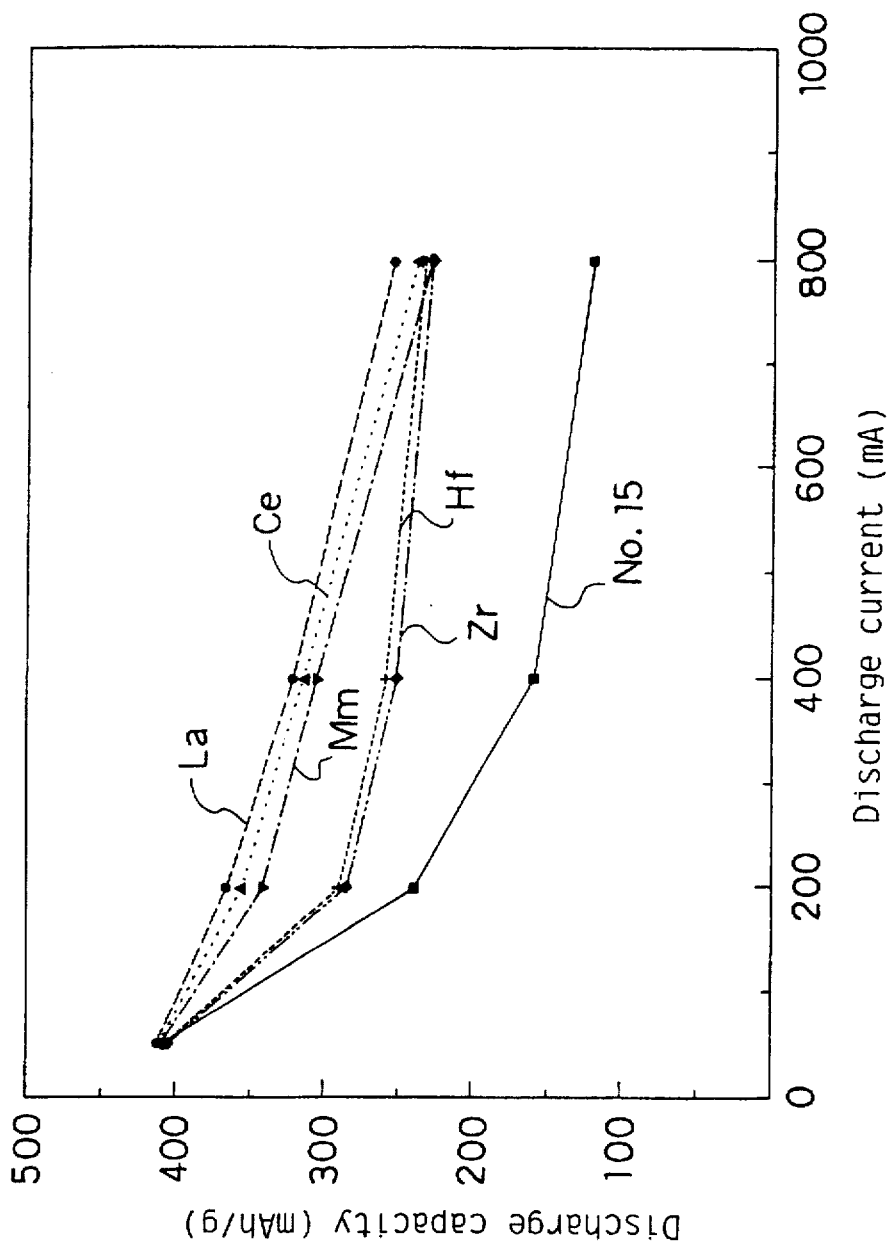
FIG. 7 is a graph showing high-rate discharge characteristics at 0° C. of batteries using various alloy negative electrodes in accordance with examples of the present invention.

The high-rate discharge characteristics at 0° C. were measured for the alloys containing La, Ce, Mm, Zr, and Hf. Each alloy sample was charged at an electric current of 100 mA per 1 g of the alloy for 5 hours, and the discharge capacity was measured at varying discharge currents. The results of measurements are shown in FIG. 7. As clearly shown in FIG. 7, the high-rate discharge characteristics were improved in all the alloys added with such metals.

Figure 8:
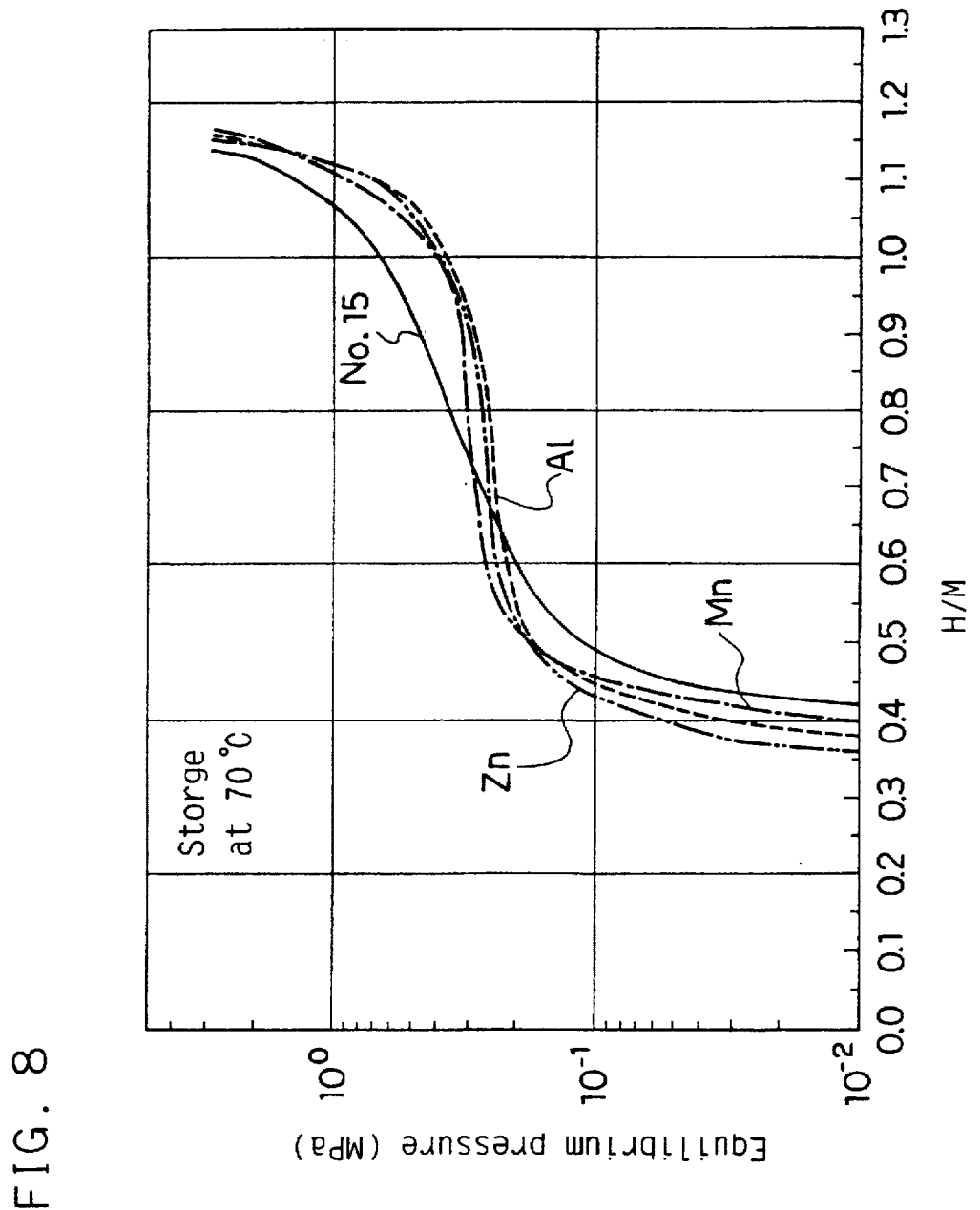
FIG. 8 is a graph showing PCT curves of alloy No.15, which is an example of the present invention, and those prepared by adding Al, Mn, or Zn to the alloy No. 15.

FIG. 8 shows PCT curves of hydrogen storage in the alloys added with Al, Mn, or Zn, respectively. The flatness of the plateau area of the hydrogen equilibrium pressure was improved in all the alloys added with such metals.

Table 3 shows a comparison of hysteresis factor (Hf) in alloys added with Si, B, P, or S, respectively. The hysteresis factor was calculated from the hydrogen absorption pressure $P_a$ and the hydrogen desorption pressure $P_d$ on the center of the plateau area according to the equation $Hf=\ln(P_a/P_d)$. The smaller Hf represents the smaller hysteresis. The results on Table 3 prove that addition of such metals to the alloys decreases hysteresis.

TABLE 3

| Composition | No. 12 | +Si | +B | +P | +S |
|---|---|---|---|---|---|
| Hf | 1.83 | 0.82 | 0.56 | 0.70 | 0.62 |

As discussed in the examples, the hydrogen storage alloys in accordance with the present invention give hydrogen storage alloy electrodes with excellent properties.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A hydrogen storage alloy having a body-centered cubic structure comprising Ti, V, Cr, and Ni as a main alloy phase, said alloy containing 1 to 10 atom % of at least one member selected from the group consisting of La, Ce and a mischmetal.

2. A hydrogen storage alloy represented by the general formula $Ti_x(V_aCr_{1-a})_{1-x}M_bNi_c$, wherein M represents at least one member selected from the group consisting of La, Ce and a mischmetal, and wherein $0.5 \leq a \leq 0.95$, $0.01 \leq b \leq 0.1$, $0.1 \leq c \leq 0.6$, and $0.2 \leq x \leq 0.4$, said alloy having a body-centered cubic structure as a main alloy phase.

3. The hydrogen storage alloy in accordance with claim 1, wherein said alloy further comprises a second phase, which is mainly composed of one or a plurality of La, Ce or mischmetal, dispersed in said main alloy phase.

4. The hydrogen storage alloy in accordance with claim 1, wherein said alloy has been prepared by abruptly cooling at a rate of $10^3$ to $10^{7\circ}$ C./second after melting.

5. The hydrogen storage alloy in accordance with claim 4, wherein said alloy has been pulverized to fine particles after melting and cooling.

6. The hydrogen storage alloy in accordance with claim 2, wherein said alloy further comprises a second phase, which is mainly composed of one or a plurality of La, Ce or mischmetal, dispersed in said main alloy phase.

7. The hydrogen storage alloy in accordance with claim 2, wherein said alloy has been prepared by abruptly cooling at a rate of $10^3$ to $10^{7\circ}$ C./second after melting.

8. The hydrogen storage alloy in accordance with claim 7, wherein said alloy has been pulverized to fine particles after melting and cooling.

9. A hydrogen storage alloy electrode comprising the hydrogen storage alloy in accordance with claim 1 or a hydride thereof.

10. A hydrogen storage alloy electrode comprising the hydrogen storage alloy in accordance with claim 2 or a hydride thereof.

* * * * *